(12) United States Patent
Straub et al.

(10) Patent No.: US 6,339,877 B1
(45) Date of Patent: Jan. 22, 2002

(54) METHOD AND APPARATUS FOR REFURBISHING A VALVE SEAT IN A FUEL INJECTOR ASSEMBLY

(75) Inventors: Robert D. Straub, Lowell; William M. Galloway, Belmont; Michael Van Allsburg, Grand Rapids, all of MI (US)

(73) Assignee: Diesel Technology Company, Kentwood, MI (US)

( * ) Notice: Subject to any disclaimer, the term of this patent is extended or adjusted under 35 U.S.C. 154(b) by 0 days.

(21) Appl. No.: 09/245,097

(22) Filed: Feb. 1, 1999

(51) Int. Cl.[7] ................................................ B23P 15/00
(52) U.S. Cl. ................................ 29/888.42; 29/890.21; 29/557
(58) Field of Search ........................ 29/890.121, 888.44, 29/557, 402.19; 82/1.2, 1.4; 408/1 R

(56) References Cited

U.S. PATENT DOCUMENTS 5,139,042 A * 8/1992 Calhoun ................ 29/890.121
6,035,532 A * 3/2000 Earnhardt ................ 29/888.44

* cited by examiner

*Primary Examiner*—I Cuda Rosenbaum
(74) *Attorney, Agent, or Firm*—Brooks & Kushman P.C.

(57) ABSTRACT

An apparatus and method of refurbishing a valve seat disposed at a predetermined angle relative to the centerline of an associated valve bore in a workpiece wherein the apparatus includes a support structure on which the workpiece is located such that the centerline of the valve bore is aligned with a known reference axis. The apparatus further includes a tool having a lapping portion corresponding to the valve seat and a drive mechanism for moving the tool along the known reference axis such that the lapping portion is brought into engagement with the valve seat and for rotating the tool relative to the workpiece to lap the valve seat. The method generally includes locating the workpiece in a predetermined position such that the centerline of the valve bore is aligned with the known reference axis and moving the tool having a lapping portion corresponding to the valve seat along the known reference axis such that the lapping portion is brought into engagement with the valve seat. The tool is then rotated relative to the workpiece to lap the valve seat, and the tool is then moved along the known reference axis to disengage the lapping portion from the valve seat.

10 Claims, 3 Drawing Sheets

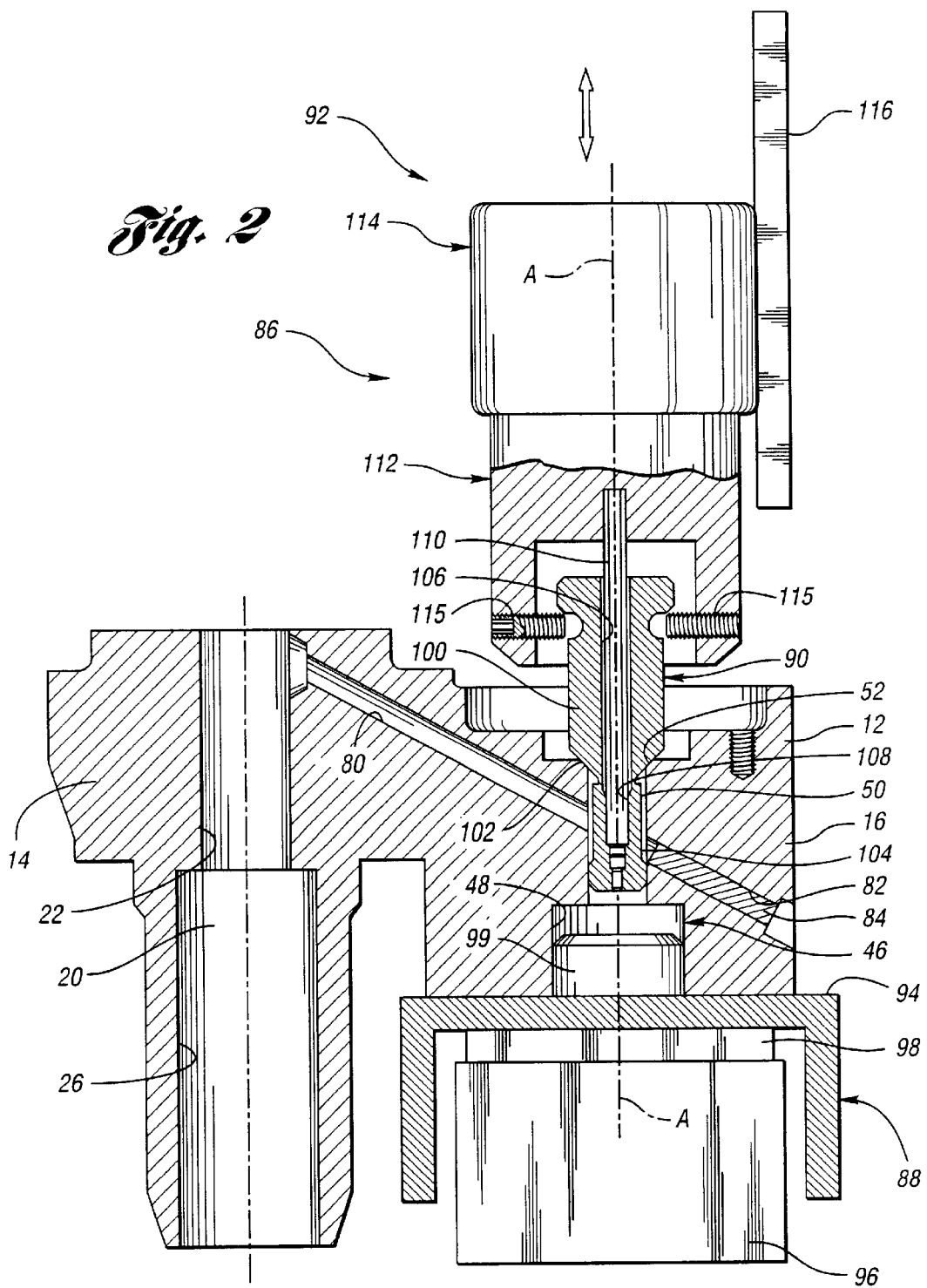

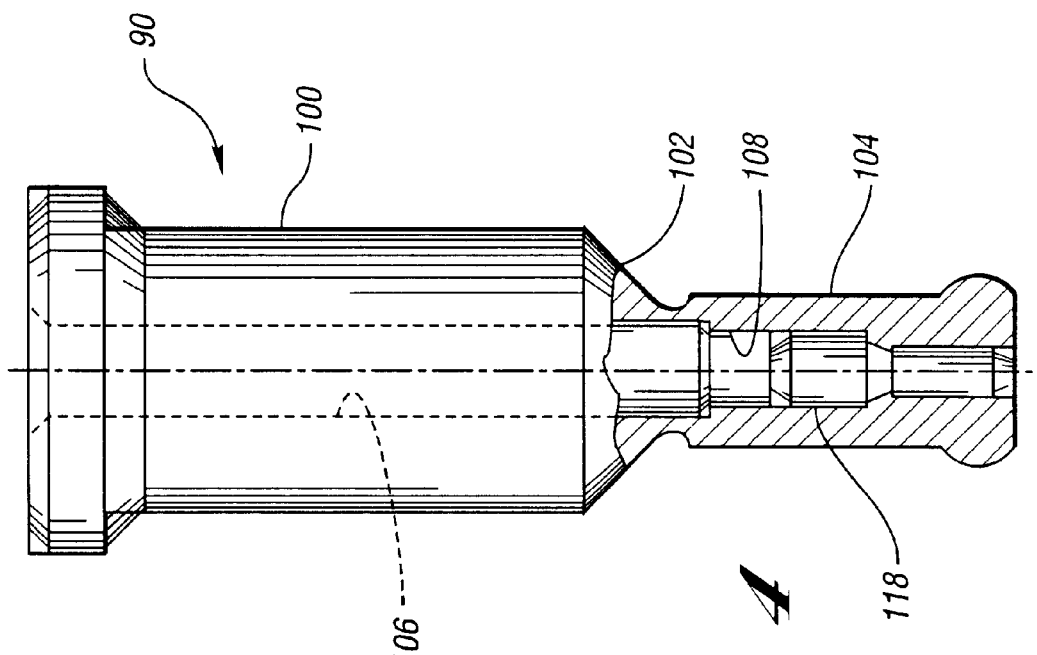
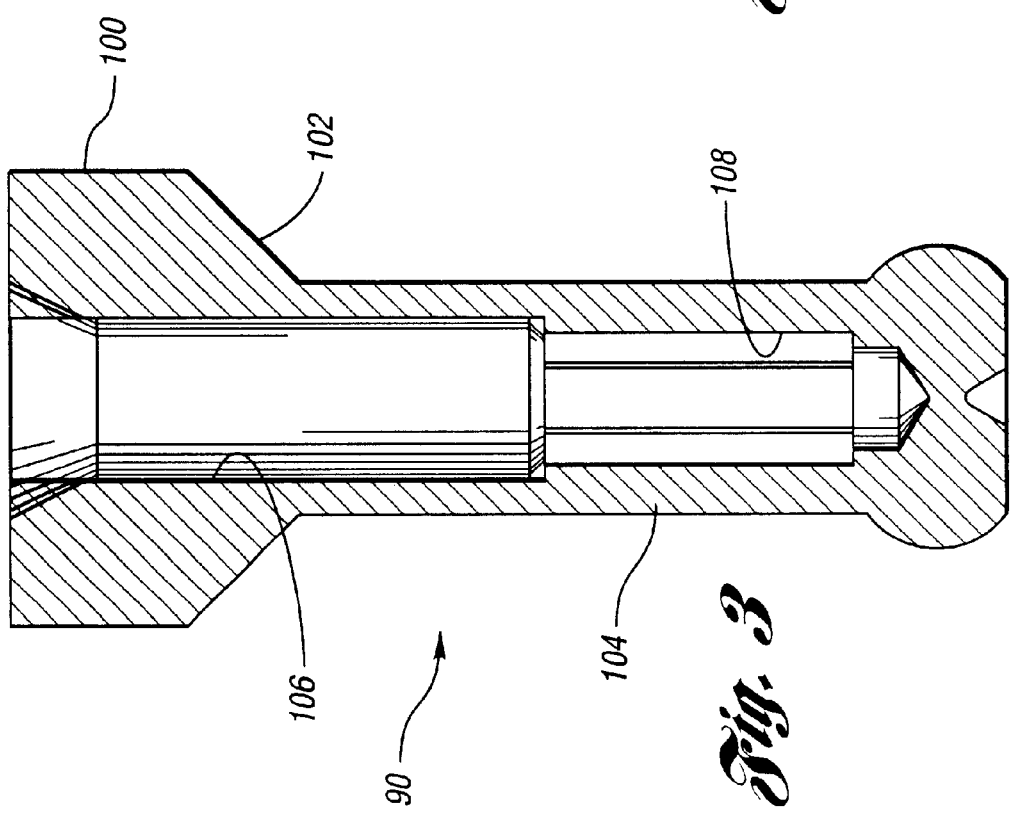

METHOD AND APPARATUS FOR REFURBISHING A VALVE SEAT IN A FUEL INJECTOR ASSEMBLY

BACKGROUND OF THE INVENTION

1. Field of the Invention

The present invention relates, generally, to a method and apparatus for refurbishing a valve seat. More specifically, the present invention relates to a method and apparatus for refurbishing the valve seat associated with a valve bore extending through a fuel injector body.

2. Background Art

Fuel injector assemblies are employed in internal combustion engines for delivering a predetermined, metered mixture of fuel and air to the combustion chamber at preselected intervals. In the case of compression ignition, or diesel engines, the fuel/air mixture is delivered at relatively high pressures. Presently, conventional injectors deliver this mixture at pressures as high as 32,000 psi. These are fairly high pressures and have required considerable engineering attention to ensure the structural integrity of the injector, good sealing properties, and the effective atomization of the fuel within the combustion chamber. However, increasing demands on greater fuel economy, cleaner burning, fewer emissions and $NO_x$ control have placed, and will continue to place, even higher demands on the engine's fuel delivery system, including increasing the fuel pressure within the injector. Fuel injectors presently employed in the related art typically include a high pressure fuel passage, which extends between a solenoid actuated control valve and the plunger cylinder in the injector body. Fuel at relatively low pressure is supplied to the control valve which then meters the delivery of the fuel at very high pressures and at predetermined intervals through the high pressure fuel passage to the plunger cylinder. The fuel ultimately exits the injector through a fuel nozzle.

The solenoid actuated control valve is supported in a stepped bore which typically extends through a side body of the injector. The stepped bore defines a supply chamber and a valve bore, which receives a valve stem of the associated control valve. The valve bore terminates in a chamfered valve seat which is formed so as to define an angle relative to the centerline of the valve bore. Similarly, the valve stem terminates in a head which seats against the valve seat under the force generated by the solenoid. The head is configured to mate closely with the valve seat.

At least a portion of the valve stem is subject to the high pressure generated in a valve opening direction during an injection cycle. Accordingly, the solenoid must generate sufficient force in the valve closing direction to overcome such pressure. These forces are borne by the valve seat through the head of the control valve. Fuel injectors and their associated sub-components must endure millions of injection cycles during a standard useful life of the injector. While individual components may wear out, the injector body, per se, having no moving parts, is capable of reuse. The injector body is an expensive part of the injector assembly. It includes many precisely machined ports, passageways, slots, and other surfaces. However, one barrier to the reuse of the injector body has been refurbishing the solenoid valve seat. The valve seat typically endures significant punishment over the useful life of the injector and must be machined to bring it back within specification. The concentricity of the valve seat about the centerline of the valve bore is an important parameter that must be precisely controlled during any refurbishing process. In the past, there has been a lack of methods and apparatuses that may be employed to quickly, effectively and efficiently refurbish the solenoid valve seat on a production basis. This fact has contributed to the tendency to scrap the injector body after the less durable sub-components have been spent.

Thus, there is a need in the art for a method and apparatus which may be employed to refurbish or recondition the solenoid valve seat on a production basis and thereby extend the useful life of the injector body.

SUMMARY OF THE INVENTION

The present invention overcomes the disadvantages in the related art in a method and apparatus of refurbishing a valve seat disposed at a predetermined angle relative to the centerline of an associated valve bore in a workpiece, such as an injector body. The method includes the steps of locating the workpiece in a predetermined position relative to a support structure such that the centerline of the valve bore is aligned with a known reference axis. A tool having a lapping portion corresponding to the valve seat is then moved along the known axis such that the lapping portion is brought into engagement with the valve seat. The tool is rotated relative to the workpiece to lap the valve seat and then moved along the known axis to disengage the lapping portion from the valve seat. Similarly, the apparatus of the present invention includes a support structure on which the workpiece is located such that the centerline of the valve bore is aligned with the known axis. The apparatus also includes a tool having a lapping portion corresponding to the valve seat and a drive mechanism for moving the tool along the known axis such that the lapping portion is brought into engagement with the valve seat. The drive mechanism also rotates the tool relative to the workpiece to lap the valve seat.

One advantage of the present invention is that a method and apparatus are provided which are adapted to quickly, efficiently and effectively refurbish a valve seat on an injector body on a production basis. Another advantage of the present invention is that the useful life of an injector body may be extended beyond the relatively short lives of certain injector sub-components. Still another advantage of the present invention is that the valve seat is refurbished while the concentricity of the valve seat about the centerline of the valve bore is closely controlled.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a cross-sectional side view of the apparatus for refurbishing a valve seat of the present invention;

FIG. 3 is a cross-sectional side view of the tool employed in the present invention for refurbishing the valve seat; and FIG. 4 is a partial cross-sectional side view of another embodiment of the tool used to refurbish the valve seat of the present invention.

DETAILED DESCRIPTION OF THE PREFERRED EMBODIMENTS

Figure 1:
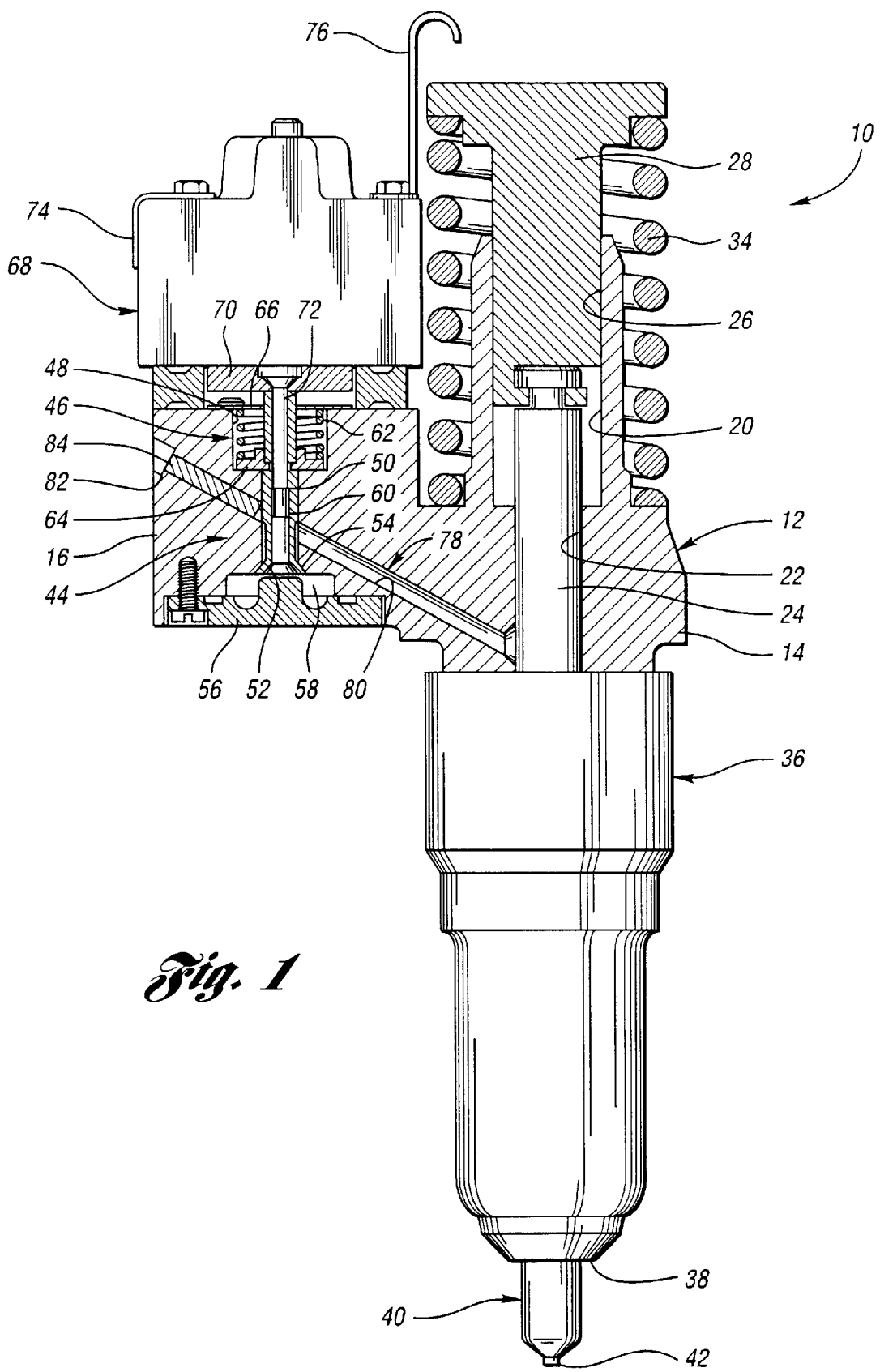
FIG. 1 is a partial cross-sectional side view of an electromagnetic fuel injector.

Referring now to FIG. 1, there is generally shown an electromagnetic fuel injector of the type commonly employed in the related art. More specifically, a fuel injector pump assembly 10 is shown in FIG. 1 having an electromagnetically-actuated, pressure-balanced control valve incorporated therein to control fuel discharge from the injector portion of this assembly 10 in a manner to be described. As illustrated in this figure, the electromagnetic fuel injector assembly 10 includes an injector body 12, which has a vertical main body portion 14 and a side body portion 16. The main body portion 14 includes a stepped, cylindrical bore 20 therethrough. The stepped, cylindrical bore 20 includes a cylindrical lower wall 22, which slidably receives a pump plunger 24. In addition, the stepped, cylindrical bore 20 includes an upper wall 26 of larger internal diameter to slidably receive a plunger actuator follower 28. The plunger actuator follower 28 extends out one end of the main body 14 whereby it and the pump plunger 24 connected thereto are adapted to be reciprocated by an engine driven cam or rocker as conventionally known in the art. A stop pin (not shown) extends through an upper portion of the main injector body portion 14 into an axial groove in the plunger actuator follower 28 to limit upward travel of the follower induced under the bias of a plunger return spring 34. A nut, generally indicated at 36, is threaded to the lower end of the main body portion 14 and forms an extension thereof. The nut 36 has an opening 38 at its lower end through which extends the lower end of a combined injector valve body or nozzle assembly, generally indicated at 40. The nozzle assembly 40 includes a spray tip 42. The nozzle assembly 40 may include a number of elements that are all well known in the art and that form no part of the present invention. Accordingly, the inner workings of the nozzle assembly 40 will not be described in detail here.

The delivery of fuel from a source such as a fuel tank to the nozzle assembly 40 is controlled by means of a solenoid-actuated, pressure-balanced valve, generally indicated at 44 in the side body portion 16. The side body portion 16 is provided with a stepped vertical valve bore, generally indicated at 46, which defines a supply chamber 48 and an intermediate or valve stem guide portion 50. The guide portion 50 of the valve bore 46 terminates in a valve seat 52. The valve seat 52 is chamfered so as to define an angle relative to the centerline of the valve bore 46. The valve 44 is received within the stepped vertical valve bore 46 and includes a valve stem 60 terminating in a head 54 which seats against the valve seat 52. The stem 60 extends upward from the head 54. A closure cap 56 is mounted to the underside of the side body portion 16 and in connection therewith forms a spill chamber 58. The valve 44 is normally biased in a valve opening direction, downward with reference to FIG. 1, by means of a coil spring 62, which loosely encircles valve stem 60. On end of the spring 62 abuts against a washer-like spring retainer 64 encircling the valve stem 60. The other end of the spring 62 abuts against the lower face of a spring retainer 66. Movement of the valve 44 in the valve closing direction, upward with reference to FIG. 1, is effected by means of a solenoid assembly, generally indicated at 68. The solenoid assembly 68 includes an armature 70 having a stem 72 depending centrally from its head. The armature 70 is secured to the valve 44. As commonly known in the art, the solenoid assembly 68 may further include a stator assembly having an inverted cup shaped solenoid case 74. A coil bobbin supporting a wound solenoid coil and a segmented multi-piece pole piece are typically supported within the solenoid case 74. The solenoid coil is connected through electrical connectors 76 to a suitable source of electrical power via a fuel injection electronic control circuit (not shown). Thus, the solenoid coil can be energized as a function of the operating conditions of an engine.

A high pressure fuel passage, generally indicated at 78, provides fluid communication between the control valve 44 and the fuel nozzle assembly 40. As shown in FIG. 1, the fuel passage 78 is formed by drilling a hole from one side of the side body portion 16 of the injector body 12 and between control valve 44 and the stepped cylindrical bore 20. In this way, the fuel passage 78 defines a delivery portion 80 extending between the control valve 44 and the stepped cylindrical bore 20 and a stub portion 82 extending between the valve stem guide portion 50 in the control valve 44 and the side body portion 16. A plug 84 seals the open end of the stub portion 82 of the high pressure fuel passage 78. As mentioned above, fuel injectors and their associated sub-components must endure millions of injection cycles during a standard useful life of the injector. The valve seat 52 typically endures significant punishment over the useful life of the injector as the valve 44 moves between its open and closed positions thus repeatedly forcing the head 54 of the valve 44 against the valve seat 52 when the valve 44 is in its closed position. Typically, if the life of the injector body 12 is to be extended, the valve seat 52 must be refurbished. In the past, there has been a lack of methods and apparatuses which may be employed to quickly, effectively and efficiently refurbish the solenoid valve seat 52 on a production basis. The present invention overcomes this disadvantage in the related art. It includes an apparatus for refurbishing a valve seat disposed at a predetermined angle relative to the centerline of an associated valve bore 46 in a workpiece, such as an injector body 12. Such an apparatus is generally indicated at 86 in FIG. 2. The apparatus 86 includes a support structure, generally indicated at 88, on which the injector body 12 is located such that the centerline of the valve bore 46 is aligned with a known reference axis "A". Furthermore, the apparatus 86 includes a tool, generally indicated at 90, having a lapping portion 102 corresponding to the valve seat 52. A drive mechanism, generally indicated at 92, is employed for moving the tool 90 along the known reference axis "A" such that the lapping portion 102 is brought into engagement with the valve seat 52, as will be described in greater detail below. The support structure 88 includes a platform 94, a base 96 and a thrust bearing 98 disposed therebetween. The platform 94 has a locator 99 disposed thereon for fixing the location of the injector body 12 such that the centerline of the valve bore 46 is aligned with the known axis "A". More specifically, the locator is a locator hub 99 extending upwardly relative to the platform 94. The hub 99 is adapted to be received in an open end of the valve bore 46 opposite the valve seat 52. The platform 94 is movable relative to the base 96 so as to ensure alignment of the centerline of the valve bore 46 relative to the known reference axis "A" to compensate for any error between the known axis and the centerline of the valve bore 46. More specifically, the centerline of the hub 99 is coincident with the centerline of the tool 90 and the known reference axis "A". As the tool 90 is moved vertically with reference to FIG. 2 and the tool enters the valve bore 46 of the injector body 12, the injector body 12 is free to move via the floating platform 94 between 0.030 and 0.040 inches in all directions so that the centerline of the tool 90 coincides exactly with the centerline of the hub 99. Variations from workpiece to workpiece are zeroed out by this movement. This feature allows the valve seat 52 on the injector body 12 to accurately mate with the lapping portion 102 of the tool 90. Furthermore, the valve body may be reconditioned with little or no effect on the original concentricity of the valve seat 52 with respect to the valve bore 46, as will be described in greater detail below.

As best shown in FIG. 3, the tool 90 includes a cylindrical body having a longitudinal axis aligned with the known axis. It includes a first portion 100 having a larger diameter and a second portion 104 of reduced diameter. The lapping portion 102 extends between the first and second portions 100 and 104 at a predetermined angle corresponding to the predetermined angle of the valve seat 52 relative to the centerline of the valve bore 46. The second portion 104 defines a nose, which is adapted to be received within the valve bore 46 as the lapping portion 102 is brought into engagement with the valve seat 52. A blind bore 106 having at least a portion 108 thereof forming a hexagonal shape is formed axially in the tool 909 and extends past the lapping portion 102 in the tool 90. The blind bore 106 is adapted to receive a hex driver 110 which is attached to the driver mechanism 92, as will be discussed in greater detail below. Another embodiment of the tool 90 is shown in FIG. 4, where like numerals are used to designate like structure. The lapping portion 102 of the tool is coated with an abrasive for reconditioning the valve seat 52 as the tool 90 is rotated relative to the injector body 12. More specifically, the lapping portion 102 may be coated with a layer of borzon abrasive, which may have various grit sizes to control stock removal and the finish of the valve seat 52. For example, tools 90 coated with 200 to 400 grit borzon abrasive are more aggressive and are used to removed "pound in" and to generate a flat surface. On the other hand, 500, 600, 800 and 1000 grit borzon coatings may be used to generate a smooth surface on the refurbished valve seat 52. The tool 90 generates a smooth flat surface on the valve seat 52 and a clean sharp edge at the intersect of the valve seat 52 and the valve bore 46.

The drive mechanism 92 includes a spindle, generally indicated at 112, and a drive assembly, generally indicated at 108. The tool 90 is removably mounted on the spindle 112 by adjustable screws 115, snap-fit ball and socket type connectors or any other suitable fastening device. As noted above, the hex-shaped driver 110 is received within the hexagonal shaped portion 108 of the blind bore 106 and is driven by the spindle 112. The drive assembly 114 functions to alternatingly rotate the tool 90 in clockwise and counterclockwise directions relative to the injector body 12. To this end, the drive assembly 114 may include a gear set. The gear set is adapted to alternatingly rotate the tool 90 counterclockwise 30° and clockwise 20° relative to the workpiece for a net 10° advancement in the counterclockwise direction. The drive assembly 114 may be driven pneumatically to rotate the tool 90 at a rate between 10 to 60 rpm. Within this larger range, the rate of rotation may be between 30 and 40 rpm.

The drive mechanism 92 further includes a precision slide assembly, schematically illustrated at 116, for moving the tool 90 mounted on the spindle 112 along the known axis to bring the lapping portion 102 into contact with the valve seat 52. A counterbalance system (not shown) may be employed so that the weight of the tool 90, spindle 112, and drive assembly 114 is zeroed out by the counter weight. The vertical movement of the drive assembly 114, spindle 112, and tool 90 may be produced by a pneumatic cylinder (optimally having a 1 inch bore) attached to the slide assembly 116. By regulating the air pressure to the pneumatic cylinder, the optimum force may be obtained between the tool 90 and the injector body 12. This may be accomplished using two solenoid actuated control valves, which control the actuation of the pneumatic cylinder.

Employing the elements of the apparatus 86 as described above, a method of refurbishing the valve seat 52, which is disposed at a predetermined angle relative to the centerline of an associated valve bore 46, may be practiced. The method includes the step of locating the workpiece in a predetermined position such that the centerline of the valve bore 46 is aligned with the known axis "A". The hub 99 on the platform 94 of the support structure 88 serves this purpose. This step may further include adjusting the location of the workpiece, in this case an injector body, relative to the known axis by moving a support structure 88 to compensate for any error between the known axis and the centerline of the valve bore 46. Additionally, the method includes the step of moving the tool 90, having a lapping portion 102 corresponding to the valve seat 52, along with the known axis such that the lapping portion 102 is brought into engagement with the valve seat 52. The tool 90 is then rotated relative to the injector body 12 to lap the valve seat 52. Following the step of lapping the injector body 12, the tool 90 is moved along the known axis to disengage the lapping portion 102 from the valve seat. The step of rotating the tool 90 may also include clockwise and counterclockwise rotational directions. More specifically, this step may include alternately rotating the tool 90 30° counterclockwise and then 20° clockwise at a rate of between 10 and 60 rpm for a net gain of 10° in the counterclockwise direction. Within this broad range, the tool may be rotated at a rate between 30 and 40 rpm.

The step of moving the tool 90 such that the lapping portion 102 is brought into engagement with the valve seat 52 may also include the step of generating a contact pressure between the lapping portion and the valve seat between 5 and 50 psi and lapping the valve seat 52 for a predetermined amount of time. The method further includes the step of lapping the valve seat with 100 to 400 grit abrasive and lapping the valve seat with 500 to 1000 grit abrasive.

In one embodiment, the valve seat 52 is lapped in two cycles. During the first cycle, a pressure of 25 to 50 psi is applied to the valve seat 52 of the injector body 12 via the lapping portion 102 of the tool 90 using 200 to 400 grit borzon abrasive on the lapping portion 102. This grade of abrasive provides a more aggressive cleanup action on the valve seat 52 and generates a flat surface. A second cycle is then employed in the manner described above using 5 to 15 psi pressure and 400 to 1000 grit abrasive which generates a smooth surface on the valve seat 52. These cycles are timed so that an optimum balance between stock removal and finish may be achieved.

In this way, the worn valve seats 52 on a used injector body 12 may be quickly, efficiently and effectively refurbished on a production basis thereby extending the useful life of the injector body 12. Additionally, the valve seat 52 is refurbished while the concentricity of the valve seat about the centerline of the valve bore 46 is closely controlled. The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A method of refurbishing a valve seat in an associated valve bore in a workpiece, the valve bore having a centerline, the valve seat being disposed at a predetermined angle relative to the centerline of the associated valve bore in the workpiece, a platform with a locator hub supporting the workpiece, the hub having a known reference axis, said method comprising:

locating the workpiece in a predetermined position such that the centerline of the valve bore is aligned with the known reference axis;

moving a tool having a lapping portion corresponding to the valve seat along the known axis such that the lapping portion is brought into engagement with the valve seat;

rotating the tool relative to the workpiece to lap the valve seat; and moving the tool along the known axis to disengage the lapping portion from the valve seat.

2. A method as set forth in claim 1 including the step of rotating the tool in clockwise and counterclockwise directions.

3. A method as set forth in claim 1 including the step of alternatingly rotating the tool 30° counterclockwise and then 20° counterclockwise.

4. A method as set forth in claim 2 further including the steps of rotating the tool at a rate between 10 and 60 rpm.

5. A method as set forth in claim 2 further including the steps of rotating the tool at a rate between 30 and 40 rpm.

6. A method as set forth in claim 1 further including the step of generating a contact pressure between the lapping portion and the valve seat between 5 and 50 psi.

7. A method as set forth in claim 1 further including the step of lapping the valve seat for a predetermined amount of time.

8. A method as set forth in claim 1 further including the step of lapping the valve seat with 100 to 400 grit abrasive.

9. A method as set forth in claim 1 further including the step of lapping the valve seat with 500 to 1000 grit abrasive.

10. A method as set forth in claim 1 further including the step of adjusting the location of the workpiece relative to the known axis by moving a support structure to compensate for any error between the known axis and the centerline of the valve bore.

* * * * *